(12) United States Patent
Yasunaga et al.

(10) Patent No.: US 11,868,146 B2
(45) Date of Patent: Jan. 9, 2024

(54) PHOTOGRAPHING DEVICE AND METHOD

(71) Applicant: TOSHIBA TEC KABUSHIKI KAISHA, Tokyo (JP)

(72) Inventors: Masaaki Yasunaga, Sunto Shizuoka (JP); Keita Yamazaki, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 295 days.

(21) Appl. No.: 17/230,145

(22) Filed: Apr. 14, 2021

(65) Prior Publication Data

US 2021/0365053 A1 Nov. 25, 2021

(30) Foreign Application Priority Data

May 20, 2020 (JP) ................................. 2020-088232

(51) Int. Cl.
| | |
|---|---|
| *G05D 1/10* | (2006.01) |
| *B64C 39/02* | (2023.01) |
| *H04N 7/18* | (2006.01) |
| *G05D 1/00* | (2006.01) |
| *H04N 23/695* | (2023.01) |
| *G06K 7/14* | (2006.01) |
| *G06Q 10/087* | (2023.01) |
| *B64U 10/13* | (2023.01) |

(52) U.S. Cl.
CPC ........... *G05D 1/106* (2019.05); *B64C 39/024* (2013.01); *G05D 1/0094* (2013.01); *H04N 7/185* (2013.01); *H04N 23/695* (2023.01); *B64U 10/13* (2023.01); *B64U 2201/10* (2023.01); *G06K 7/1413* (2013.01); *G06K 7/1417* (2013.01); *G06Q 10/087* (2013.01)

(58) Field of Classification Search
CPC .... G05D 1/106; G05D 1/0094; B64C 39/024; H04N 7/185; H04N 23/695; H04N 23/61; B64U 10/13; B64U 2201/10; B64U 2101/30; G06Q 10/087
See application file for complete search history.

(56) References Cited

U.S. PATENT DOCUMENTS

| | | | | |
|---|---|---|---|---|
| 9,471,064 | B1 * | 10/2016 | Boland | G06N 7/01 |
| 10,223,670 | B1 * | 3/2019 | Oikarinen | G06V 20/17 |
| 11,164,149 | B1 * | 11/2021 | Williams | B64U 10/13 |
| 2020/0005225 | A1 * | 1/2020 | Chaubard | H04N 23/57 |

FOREIGN PATENT DOCUMENTS

WO 2015140851 A1 4/2017
WO WO-2018035482 A1 * 2/2018

* cited by examiner

*Primary Examiner* — Tyler D Paige
(74) *Attorney, Agent, or Firm* — Kim & Stewart LLP

(57) ABSTRACT

A flying drone for shelf label checking includes a flying mechanism, a camera, and a camera interface configured to transmit and receive data to and from the camera. A flight control interface is configured to transmit and receive data to and from the flying mechanism. A processor is configured to acquire a first image of an object from a first distance with the camera, then extract an object region for the object from the first image. The processor then sets a flight path based on the object region and controls the flying mechanism to fly the camera along the flight path to a second distance that is closer to the object than the first distance. A second image of the object is then acquired from the second distance with the camera.

18 Claims, 7 Drawing Sheets

PHOTOGRAPHING DEVICE AND METHOD

CROSS-REFERENCE TO RELATED APPLICATION

This application is based upon and claims the benefit of priority from Japanese Patent Application No. 2020-088232, filed on May 20, 2020, the entire contents of which are incorporated herein by reference.

FIELD

Embodiments described herein relate generally to a photographing device and a method.

BACKGROUND

A photographing device that photographs shelf labels related to products for sale in stores is known. Such a photographing device moves in front of a shelf label autonomously or under the control of an operator. The photographing device obtains a photograph including an image of a shelf label. The photographing device extracts the shelf label image and reads the information or the like written on the shelf label.

As a photographing device for photographing a shelf label, a device that flies is desired.

DETAILED DESCRIPTION

In general, according to one embodiment, a photographing device includes a camera interface configured to transmit and receive data to and from a camera and a flight control interface configured to transmit and receive data to and from a flying mechanism attached to the camera. A processor is configured to acquire a first image of an object from a first distance with the camera, then extract an object region for the object from the first image. The processor is further configured to set a flight path based on the object region and control the flying mechanism to fly the camera along the flight path to a second distance that is closer to the object than the first distance. The processor is configured to acquire a second image of the object from the second distance with the camera.

Hereinafter, certain example embodiments will be described with reference to the accompanying drawings.

A photographing system according to an embodiment photographs an object using a photographing device. The photographing system photographs a shelf label as one example of an object. The photographing device photographs the shelf label while flying. The photographing device reads information written on the shelf label based on analysis of the photographed image of the shelf label.

For example, the photographing system photographs shelf labels related to the products displayed on the shelf in a retail store. In other examples, the photographing system may photograph shelf labels related to the goods stored on the shelves in a warehouse or a distribution center. The photographing system may photograph an object other than the shelf label in some examples. The object photographed by the photographing system is not limited to any specific configuration or type.

Figure 1:
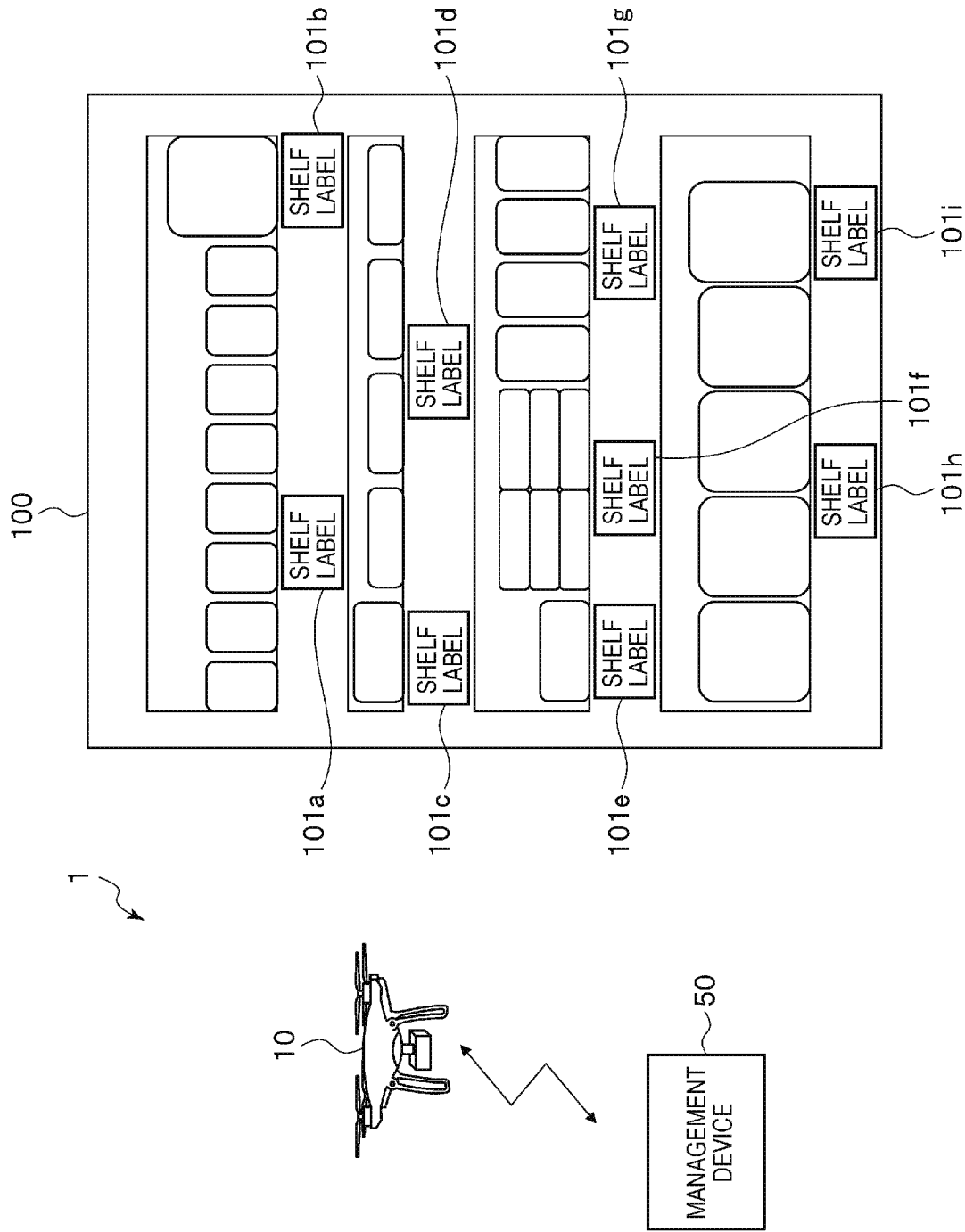
FIG. 1 is a view conceptually illustrating a configuration example of a photographing system according to an embodiment.

FIG. 1 illustrates a photographing system 1 according to an embodiment. The photographing system 1 photographs a shelf label 101 attached to a shelf 100.

The shelf 100 stores products (goods). The shelf 100 has four shelf stages (shelves or levels). The shelf 100 products are stored on each shelf stage.

The shelf 100 includes at least one shelf label 101. Each shelf label 101 is attached on a front surface of a shelf board forming a shelf stage. In this example, a shelf label 101 is attached on the front surface of each of the four shelf boards.

On the shelf label 101, information is displayed. For example, the shelf label 101 displays information related to the corresponding product (such as product name and price). In addition, the shelf label 101 may display a code (such as a bar code or two-dimensional code).

As illustrated in FIG. 1, the shelf 100 includes nine shelf labels 101a to 101i. The shelf labels 101a and 101b are attached to a front surface of a first shelf board. The shelf labels 101c and 101d are attached to a front surface of a second shelf board. The shelf labels 101e, 101f and 101g are attached to a front surface of a third shelf board. The shelf labels 101h and 101i are attached to a front surface of a fourth shelf board.

The position and the number of the shelf labels 101 attached on the shelf 100 are not limited.

The photographing device 10 photographs the shelf labels 101. The photographing device 10 is capable of flying. That is, the photographing device 10 can be made to fly to a position at which it can photograph a shelf label 101. The photographing device 10 then reads (or otherwise recognizes) the information displayed on the shelf label 101. The photographing device 10 transmits the read information to a management device 50.

For example, the photographing device 10 is a drone or the like.

The management device 50 tracks, collates, and checks the information from the photographing device 10. For example, the management device 50 checks whether there is a defect in a shelf label 101 based on the information from the photographing device 10. For example, the management device 50 is a desktop PC, a laptop PC, a tablet PC, or a smart phone.

Figure 2:
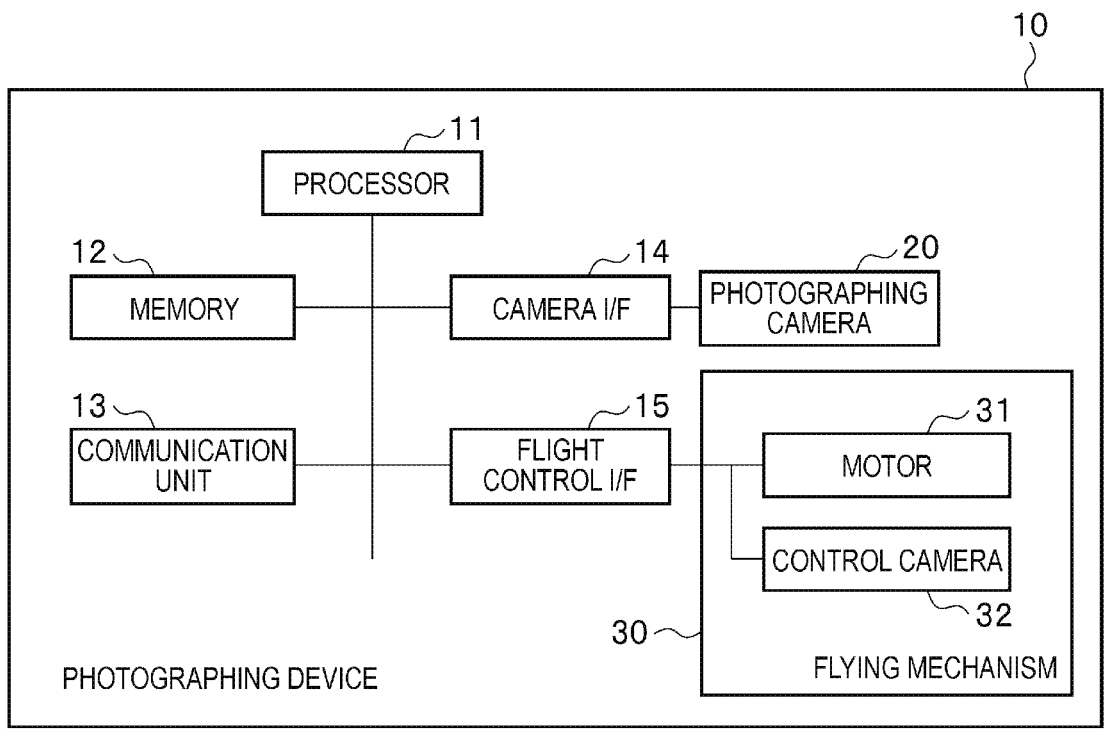
FIG. 2 is a block diagram illustrating a configuration example of a photographing device according to an embodiment.

FIG. 2 is a block diagram illustrating a configuration example of the photographing device 10 according to an embodiment. As illustrated in FIG. 2, the photographing device 10 includes a processor 11, a memory 12, a communication unit 13, a camera interface 14, a flight control interface 15, a photographing camera 20, and a flying mechanism 30. The flying mechanism 30 includes a motor 31 and a control camera 32.

The processor 11, the memory 12, the communication unit 13, the camera interface 14 and the flight control interface 15 are connected to each other via a data bus or a predetermined interface. The camera interface 14 is connected to the photographing camera 20. The flight control interface 15 is connected to the motor 31 and the control camera 32.

The photographing device 10 may have other components in addition to those specifically depicted in FIG. 2. In some examples, certain depicted components or aspects may be excluded from a photographing device 10.

The processor 11 controls the operation of the entire photographing device 10. For example, the processor 11 controls the flight of the photographing device 10. In addition, the processor 11 causes the photographing camera 20 to photograph the shelf labels 101 and the like.

For example, the processor 11 comprises a CPU or the like. In addition, in other examples, the processor 11 may be or include an ASIC (Application Specific Integrated Circuit) or the like. In some examples, the processor 11 may be or comprise a FPGA (Field Programmable Gate Array) or the like.

The memory 12 stores various data. For example, the memory 12 includes ROM, RAM, and non-volatile memory (NVM).

For example, the memory 12 stores a control program, control data, and the like. The control program and control data are incorporated according to the specifications of the photographing device 10. For example, the control program is a program that supports the various functions provided in the photographing device 10.

In addition, the memory 12 temporarily stores the data being processed by the processor 11. The memory 12 may store the data required to execute an application program and the execution result of the application program.

The communication unit 13 is an interface for transmitting and receiving data to and from the management device 50. For example, the communication unit 13 is configured to support a wireless LAN (Local Area Network) connection.

The camera interface 14 is an interface for transmitting and receiving data to and from the photographing camera 20. For example, the camera interface 14 transmits a signal instructing the photographing camera 20 based on the control of the processor 11. In addition, the camera interface 14 acquires an image obtained by the photographing camera 20. In addition, the camera interface 14 may supply power to the photographing camera 20. For example, the camera interface 14 may support a USB (universal serial bus) connection or may support a connection by camera link.

The photographing camera 20 photographs the shelf labels 101. The photographing camera 20 is installed in a housing of the photographing device 10. The photographing camera 20 is installed such that an imaging direction of the photographing camera 20 is directed in a horizontal direction. In addition, the photographing camera 20 may have a function of physically changing a camera angle by movement such as tilting, panning, zooming, or the like based on the control from the processor 11.

The photographing camera 20 transmits the photographed images through the camera interface 14 to the processor 11.

For example, the photographing camera 20 comprises a CCD (Charge Coupled Device) camera or a CMOS (Complementary Metal Oxide Semiconductor) camera.

In addition, the photographing camera 20 may include lighting or a light to aid image acquisition.

The flight control interface 15 is an interface for transmitting and receiving data to and from the flying mechanism 30. The flight control interface 15 supplies power and/or various control signals to the flying mechanism 30 according to the control of the processor 11. For example, the flight control interface 15 transmits power and/or a control signal to the motor 31. In addition, the flight control interface 15 transmits an image from the control camera 32 to the processor 11.

The flying mechanism 30 permits the photographing device 10 to fly. The flying mechanism 30 permits the photographing device 10 to perform flying maneuvers such as hovering, turning, advancing, retreating, lifting, and lowering.

The motor 31 drives a propeller or the like to causes the photographing device 10 to fly. The motor 31 may be constituted of plural motors.

The control camera 32 photographs an image for controlling the flight of the photographing device 10. The control camera 32 is installed in the housing of the photographing device 10. The control camera 32 photographs the surroundings of the photographing device 10. The control camera 32 transmits the photographed image to the processor 11. In addition, the control camera 32 may be constituted of plural cameras.

For example, the control camera 32 is a CCD camera, a CMOS camera, or the like.

In addition, the control camera 32 may be or incorporate a distance sensor that measures a distance to objects in the surroundings of the photographing device 10. For example, the control camera 32 may incorporate Light Detection and Ranging or Laser Imaging Detection and Ranging (LiDAR), or the like. In this case, the control camera 32 transmits information to the processor 11 indicating the distance to the surrounding objects.

In some examples, the photographing camera 20 and the control camera 32 may be the same camera. That is, a single camera may serve both functions.

In addition, in some examples, the photographing device 10 may not include a control camera 32.

In addition, the photographing device 10 may include an engine for driving a propeller or the like instead of or together with the motor 31.

Next, certain functions realized by the photographing device 10 will be described. The functions realized by the photographing device 10 can be realized by executing a program stored in the internal memory, the memory 12, or the like by the processor 11.

First, the processor 11 has a function of photographing the shelf labels 101 from a first distance using the photographing camera 20.

The processor 11, by controlling the flying mechanism 30, moves the photographing device 10 to a position at which a distance between the photographing camera 20 and the shelf label 101 is a first distance (for example, a distance of 1 to several meters). This position may be referred to as a wide area photographing position. The processor 11 moves the photographing camera 20 to an imaging position at which the distance between the plane including the shelf labels 101 and the photographing camera 20 is the first distance. The first distance is the distance at which the photographing camera 20 can appropriately photograph shelf labels 101 on the shelf 100.

The memory 12 stores a flight map for self-sustaining flight and the wide area photographing position in advance.

The photographing device 10 flies from its current position to the wide area photographing position using the flight control software stored in the memory 12.

For example, the processor 11 acquires the position of the photographing device 10 (for simplicity, this may be referred to as the position of the processor 11) by using the flight map and an image from the control camera 32 acquired via the flight control interface 15. After the processor 11 acquires its own position, the processor 11 generates a flight path to the wide area photographing position. Once the flight path is generated, the processor 11 controls the flying mechanism 30 to fly the photographing device 10 along the generated flight path.

In addition, in some examples, the processor 11 may fly the photographing device 10 to the wide area photographing position using GPS or the like. For example, in some instances, the processor 11 may detect an obstacle based on the surrounding image(s) acquired from the control camera 32 and fly the photographing device 10 to a wide area photographing position while avoiding the detected obstacle. In this case, the processor 11 may use radio wave intensity or a marker (such as a two-dimensional code) arranged at a predetermined position in advance to manage the wide area photographing positions and its own position.

In addition, the processor 11 may acquire the wide area photographing position through the communication unit 13.

In addition, the processor 11 may acquire its own position from the management device 50 through the communication unit 13. For example, the processor 11 transmits a surrounding image acquired from the control camera 32 through communication unit 13 to the management device 50. The management device 50 then identifies the position of the photographing device 10 based on the transmitted image or the like and then transmits the position to the photographing device 10.

In addition, in some examples, the management device 50 may control the flight of the photographing device 10. For example, the management device 50 may determine the movement direction of the photographing device 10, determine the arrival at the wide area photographing position, or give an instruction to the photographing device 10 to fly in a particular direction when the photographing device 10 is determined to be hovering.

The method of moving the photographing device 10 to the wide area photographing position is not limited to a specific method.

Once the photographing device 10 has been moved to the wide area photographing position, the processor 11 uses the flying mechanism 30 to cause the photographing device 10 to hover at the wide area photographing position. The processor 11 photographs an image (a "first image") of the shelf label 101 using the photographing camera 20 during hovering. The processor 11 acquires a first image in which the entire shelf 100 (including each of the shelf labels 101a to 101i) is included.

Figure 3:
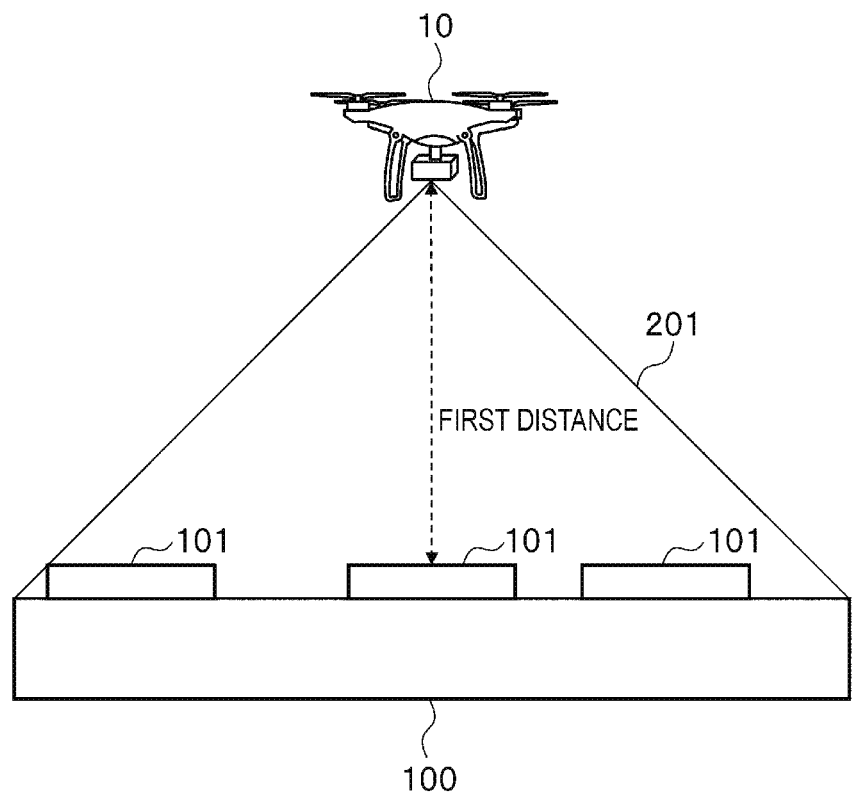
FIG. 3 is a view illustrating an operation example of a photographing device according to an embodiment.

FIG. 3 illustrates an operation example of photographing the first image by the processor 11. In FIG. 3, the photographing device 10 hovers at the wide area photographing position. As illustrated in FIG. 3, the distance between the photographing camera 20 and each shelf label 101 is the first distance. In addition, the photographing camera 20 has a photographing region 201 as a photographing area. The photographing region 201 includes the shelf 100 and each shelf label 101.

The processor 11 photographs the first image using the photographing camera 20 while the photographing device 10 is hovering at the wide area photographing position.

The processor 11 has a function of extracting a shelf label region (or object region) from the first image corresponding to each shelf label 101.

A shelf label region is a region in which the shelf label 101 is located in the first image. That is, the shelf label region is a region obtained by cutting out or isolating the shelf labels 101 from the first image. For example, a shelf label region has a rectangular shape surrounding the respectively corresponding shelf label 101. In addition, in some examples, the shelf label regions may be specified in units of pixels.

The processor 11 extracts the shelf label regions from the first image using the region extraction software stored in the memory 12 in advance. For example, the processor 11 extracts the shelf label region using the object detection technology You Only Look Once (YOLO) network (deep learning).

In addition, the processor 11 may use a Single-Shot MultiBox Detector (SSD), fully convolutional instance-aware semantic segmentation (FCIS), or the like. Further, the processor 11 may use AdaBoost with Haar-like features used for face detection. In addition the processor 11 may use a recognition engine using a local feature amount such as Scaled Invariance Feature Transform (SIFT).

The method of extracting the shelf label regions by the processor 11 is not limited.

Figure 4:
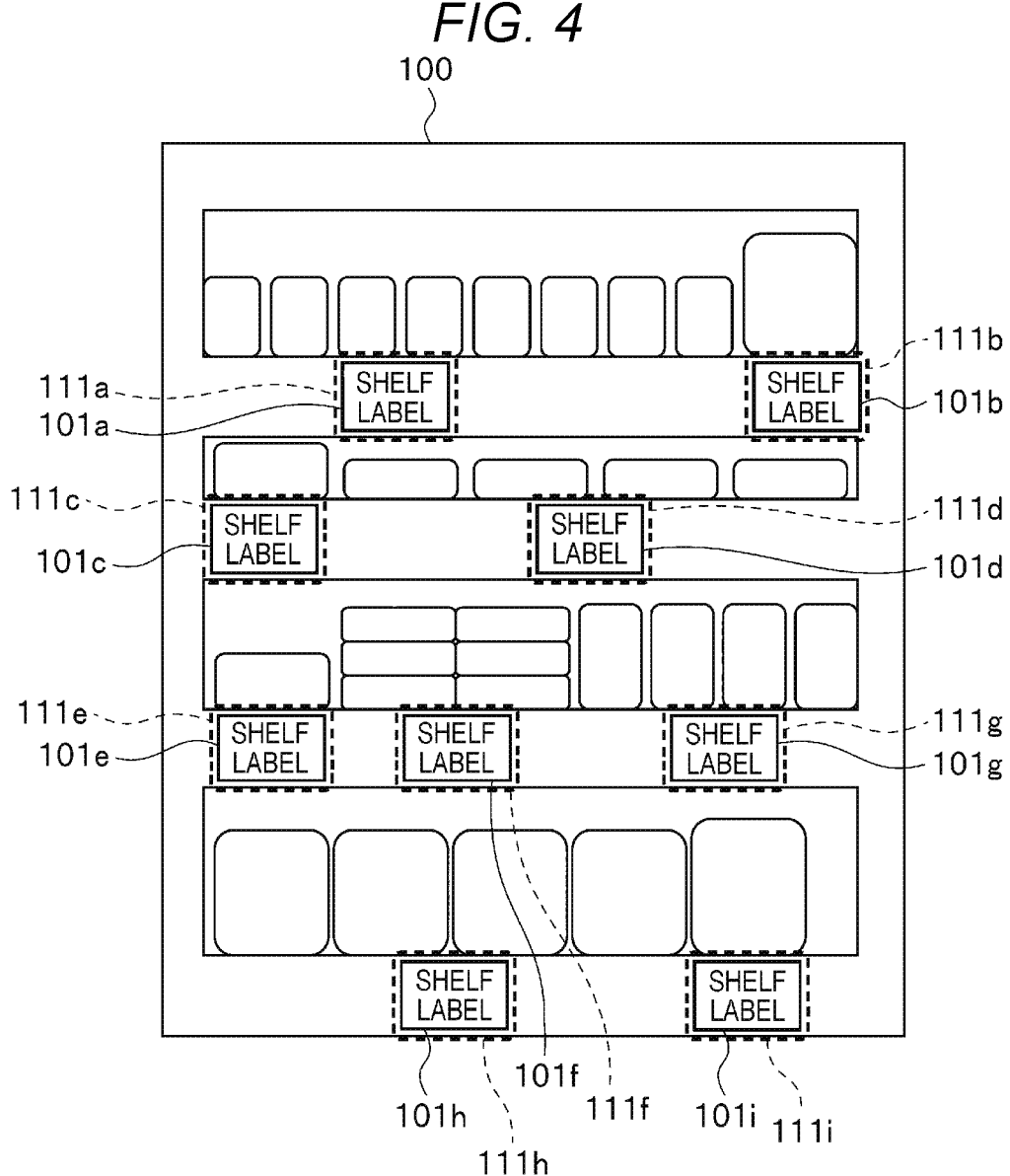
FIG. 4 is a view illustrating an example of a shelf label region extracted by a photographing device according to an embodiment.

FIG. 4 illustrates an example of the shelf label regions extracted by the processor 11. As illustrated in FIG. 4, the processor 11 extracts a plurality of shelf label regions 111 from the first image. In this example, the processor 11 extracts shelf label regions 111a to 111i, each region respectively corresponding to the shelf labels 101a to 101i.

In addition, the processor 11 has a function of setting the flight path for photographing each shelf label 101 based on the extracted shelf label region 111.

The processor 11 photographs each shelf label 101 by bringing the photographing device 10 close to each shelf label 101 as will be described in detail later. The processor 11 sets the flight path for photographing each shelf label 101.

The processor 11 sets the flight path based on the position of each shelf label region 111 (for example, the center coordinate of the shelf label region is considered the position of the shelf label regions 111). For example, the processor 11 sets a path connecting each shelf label region 111. The processor 11 sets a flight path on which the set path is formed in 3D space. The processor 11 sets a path of moving the set path to a position spaced from the shelf label 101 by a predetermined distance as the flight path. That is, the flight path is a path passing the font surface of each shelf label 101.

For example, the processor 11 sets a flight path with the shortest total flight distance. That is, the processor 11 sets a flight path that connects the front surface of each shelf label 101 with the shortest distance. The processor 11 sets the flight path by selecting the shortest path connecting the centers of each shelf label region 111.

Figure 5:
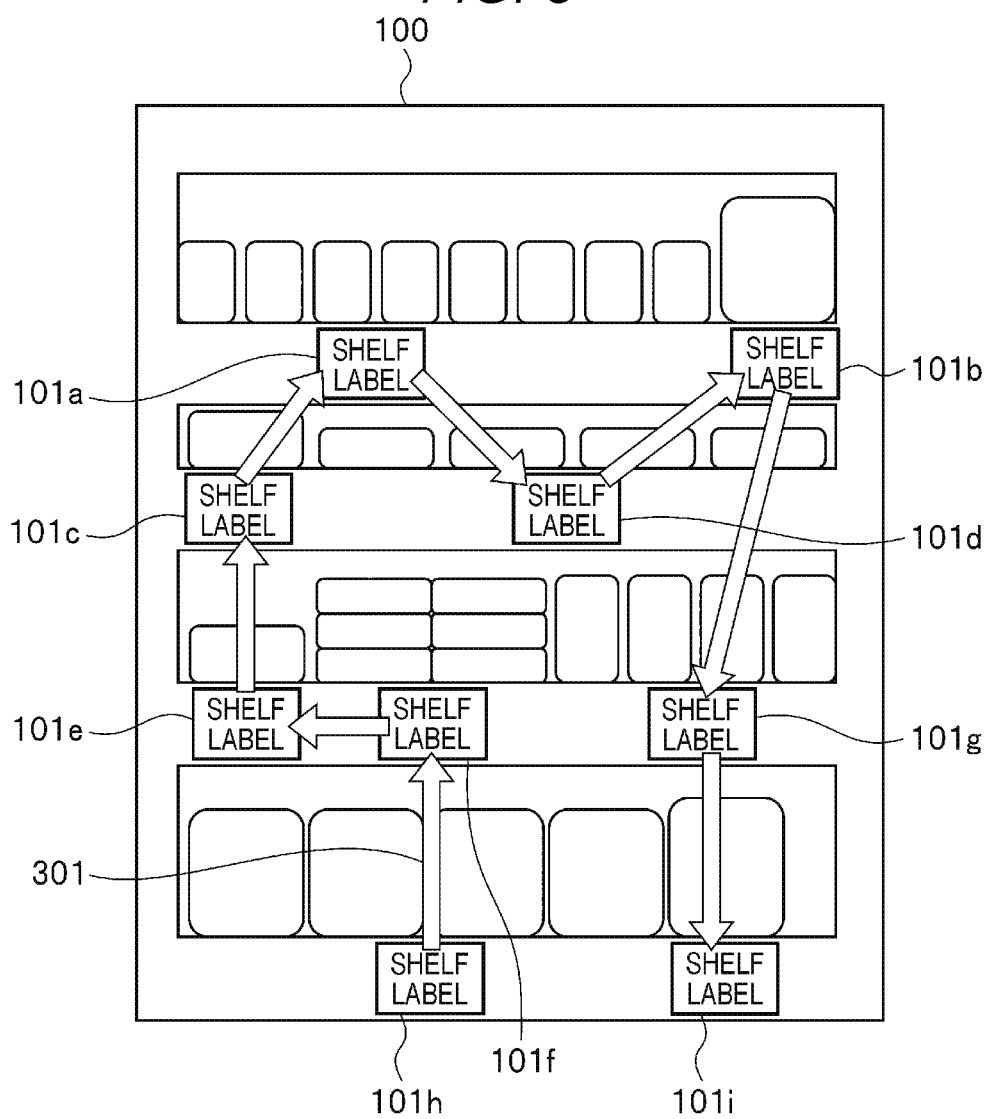
FIG. 5 is a view illustrating an example of a flight path of a photographing device according to an embodiment.

FIG. 5 illustrates an example of the flight path set by the processor 11. In the example illustrated FIG. 5, a flight path 301 is the flight path with the shortest total flight distance. That is, the flight path 301 is the shortest flight path that passes the front surface of each shelf label 101.

As illustrated in FIG. 5, the flight path 301 is a flight path connecting each shelf label 101 in the order of the shelf labels 101h, 101f, 101e, 101c, 101a, 101d, 101b, 101g, and 101i. In other examples, the flight path 301 may be a flight path connecting each shelf label 101 in the reverse order of the above order.

In addition, the processor 11 may set the flight path based on the estimated or expected power consumption (energy consumption) of the flying mechanism 30. For example, the flying mechanism 30 generally consumes more power to lift vertically than to move left and right. Therefore, the processor 11 sets the flight path with the minimum lifting and lowering. The processor 11 sets the flight path by selecting a path connecting the centers of each shelf label region 111 so that the distance in the vertical direction to the next shelf region 111 is the shortest.

Figure 6:
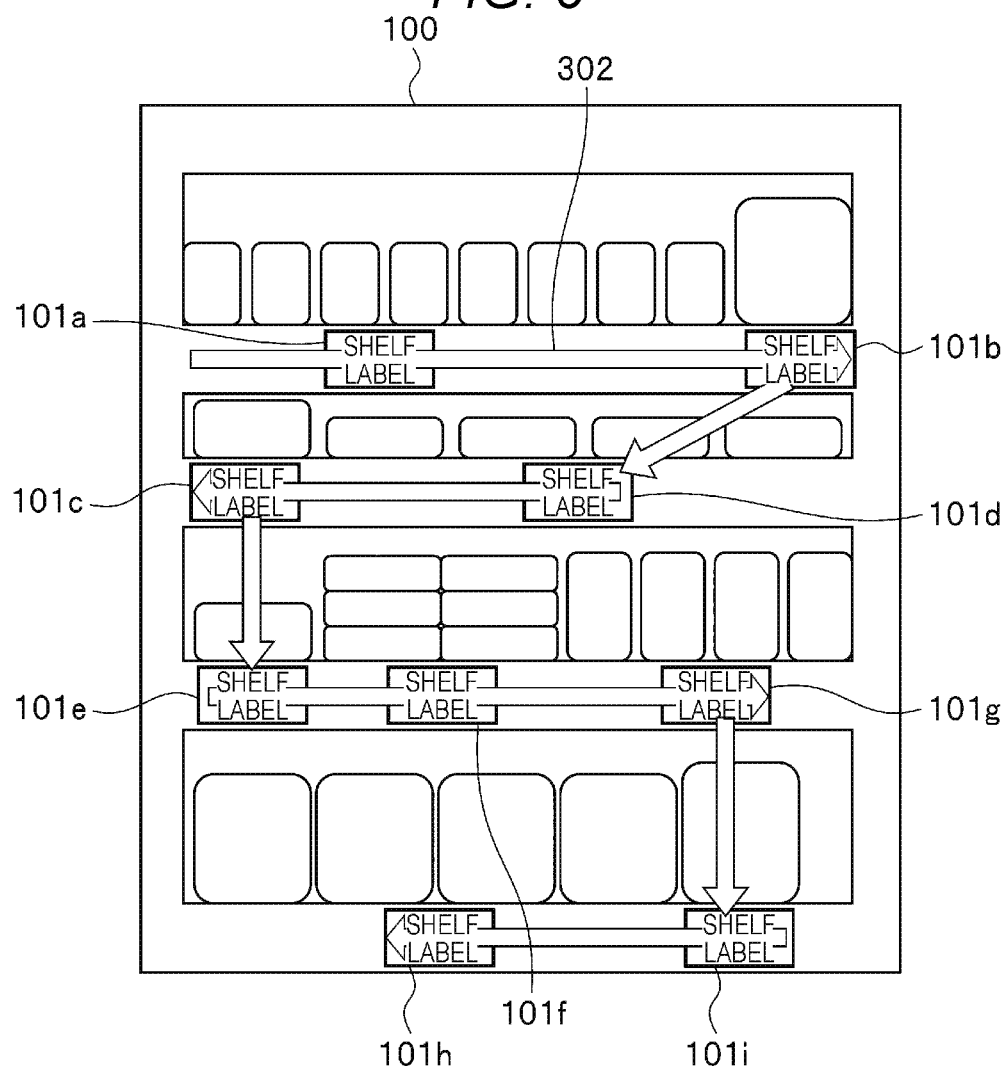
FIG. 6 is a view illustrating an example of a flight path of a photographing device.

FIG. 6 illustrates another example of a flight path set by the processor 11. In the example illustrated FIG. 6, a flight path 302 is a flight path with minimum vertical movement.

As illustrated in FIG. 6, the flight path 302 is a flight path connecting each shelf label 101 in the order of the shelf labels 101a, 101b, 101d, 101c, 101e, 101f, 101g, 101i, and 101h. In other examples, the flight path 302 may be a flight path connecting each shelf label 101 in the reverse order of the above order.

The flight path 302 preferentially passes the side-by-side shelf labels 101. That is, the flight path 302 passes by the shelf labels 101 at the same height and then moves to the shelf labels 101 at another height stage by stage.

In addition, the processor 11 may set the flight path to minimize the power consumption of flying mechanism 30. The processor 11 may set a flight path in which the power consumption is minimized based on the vertical movement distance and the total movement distance. For example, the processor 11 sets a shortest path calculated by weighting the movement in the vertical direction so that the power consumption is minimized.

Figure 7:
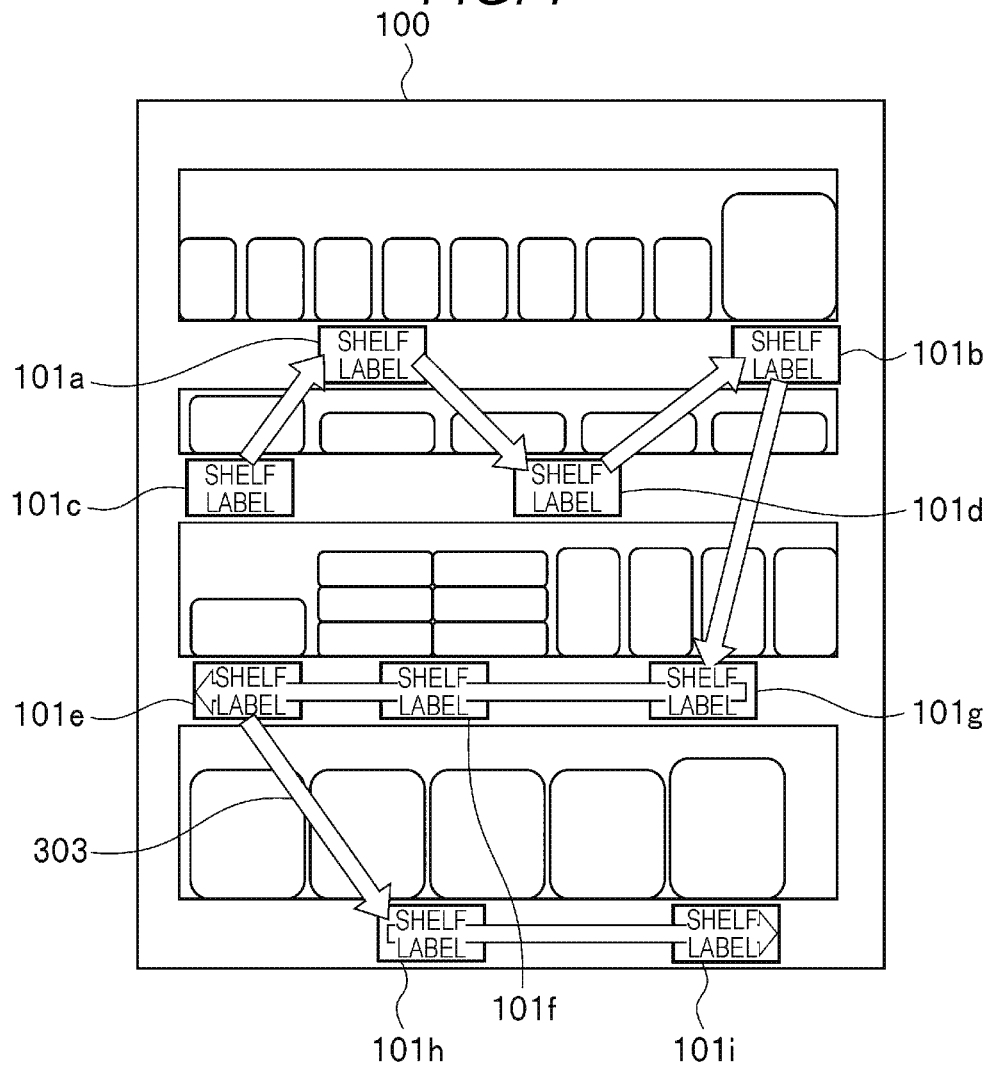
FIG. 7 is a view illustrating an example of a flight path of a photographing device.

FIG. 7 illustrates still another example of a flight path that can be set by the processor 11. In the example illustrated in FIG. 7, the flight path 303 is a flight path in which the power consumption of the flying mechanism 30 is minimized.

As illustrated in FIG. 7, the flight path 303 is a flight path connecting each shelf label 101 in the order of the shelf labels 101c, 101a, 101d, 101b, 101g, 101f, 101e, 101h, and 101i.

As illustrated in FIG. 7, the flight path 303 reduces the total flight distance while suppressing vertical movement.

In some examples, the processor 11 may set the flight path to prevent or avoid sudden stops, sudden accelerations, and sharp turns. For example, the processor 11 may set a flight path with smooth corners.

A method of setting the flight path by the processor 11 is not limited to any specific method.

In addition, the processor 11 has a function of causing the photographing device 10 to fly along the flight path using the flying mechanism 30 to permit each shelf label 101 to be photographed from the second distance, which is closer than the first distance.

The processor 11 causes the photographing device 10 to fly along the set flight path using the flying mechanism 30. The processor 11 determines whether the photographing device 10 is in front of the shelf label 101. For example, the processor 11 determines whether the photographing device 10 is at the position of the shelf label 101 on the flight path. In some examples, the processor 11 may determine whether the photographing device 10 reaches the front surface of the shelf label 101 based on the image(s) obtained from the photographing camera 20 or the control camera 32 during flight.

The processor 11 moves the photographing device 10 to a position where the distance between the photographing camera 20 and the shelf label 101 is the second distance (a narrow area photographing position) using the flying mechanism 30. The second distance is closer to the object than the first distance. For example, the second distance is several centimeters.

For example, the processor 11 causes the photographing device 10 to approach the shelf label 101 until the size of the shelf label 101 taken by the photographing camera 20 is a predetermined size (e.g., the image size taken by the photographing camera 20 at the second distance).

The processor 11 may cause the photographing device 10 to fly along the flight path while maintaining the distance between the photographing camera 20 and the surface including the shelf label 101 at the second distance.

Once the photographing device 10 is moved to the narrow area photographing position, the processor 11 causes the photographing device 10 to hover at the narrow area photographing position using the flying mechanism 30. The processor 11 photographs a second image of one shelf label 101 using the photographing camera 20 during hovering.

Figure 8:
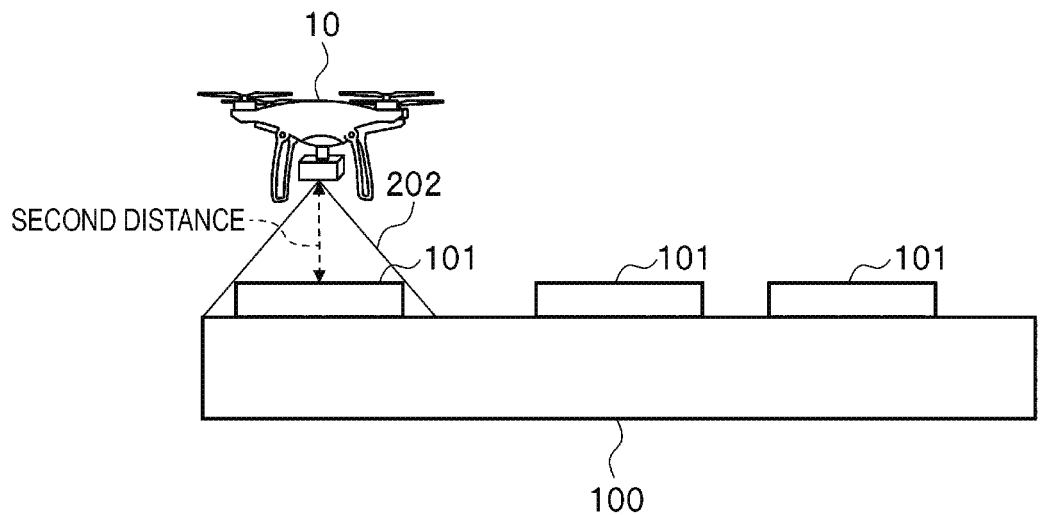
FIG. 8 is a view illustrating an operation example of a photographing device according to an embodiment.

FIG. 8 illustrates an operation example of photographing the second image by the processor 11. In FIG. 8, the photographing device 10 hovers at the narrow area photographing position. As illustrated in FIG. 8, the distance between the photographing camera 20 and the shelf label 101 is the second distance. In addition, the photographing camera 20 has a photographing region 202 as a photographing area or imaging field. The photographing region 202 includes at least one shelf label 101.

The processor 11 photographs the second image using the photographing camera 20 while the photographing device 10 is hovering at the narrow area photographing position.

Once s second image is photographed, the processor 11 causes the photographing device 10 to again fly along the flight path using the flying mechanism 30. That is, the processor 11 moves the photographing device 10 to the next shelf label 101 using the flying mechanism 30. Similar to the above, the processor 11 photographs a second image of the next shelf label 101.

The processor 11 repeats the above operation to photograph each shelf label 101.

When the photographing device 10 reaches the end of the flight path, the processor 11 ends the photographing of the shelf labels 101.

When photographing of each shelf label 101 is ended, the processor 11 may cause the photographing device 10 to fly to the next wide area photographing position. After the processor 11 causes the photographing device 10 to fly to the next wide area photographing position, the processor 11 can repeat the same operation as described above for another shelf 100 or the like.

The processor 11 causes the photographing device 10 to fly to each wide area photographing position in order to perform the same operation.

In addition, the processor 11 has a function of reading (or otherwise recognizing) information written on the shelf label 101 from the second image.

The processor 11 reads the information written on the shelf label 101 using the image or character recognition software or the like stored in the memory 12 in advance.

If the shelf label 101 includes a character string of numbers, symbols, texts, and the like, the processor 11 recognizes the character string from the second image by Optical Character Recognition (OCR) processing. For example, the processor 11 extracts a region in which the character string of the shelf label 101 is located. Once the region in which the character string is located is extracted, the processor 11 performs processing necessary to recognize the character string from the extracted region.

In addition, if the shelf label 101 includes a code (e.g., a barcode image or the like), the processor 11 extracts a region in which the code is located. Once the region in which the code is located is extracted, the processor 11 decodes the code of the extracted region and reads the encoded information.

The method(s) of reading the information utilizing the processor 11 and the content of the information are not limited.

The processor 11 transmits the read information to the management device 50 through the communication unit 13 and the like. The processor 11 may transmit multiple pieces of the read information to the management device 50 at the same time.

Next, the operation example of the photographing device 10 will be described.

Figure 9:
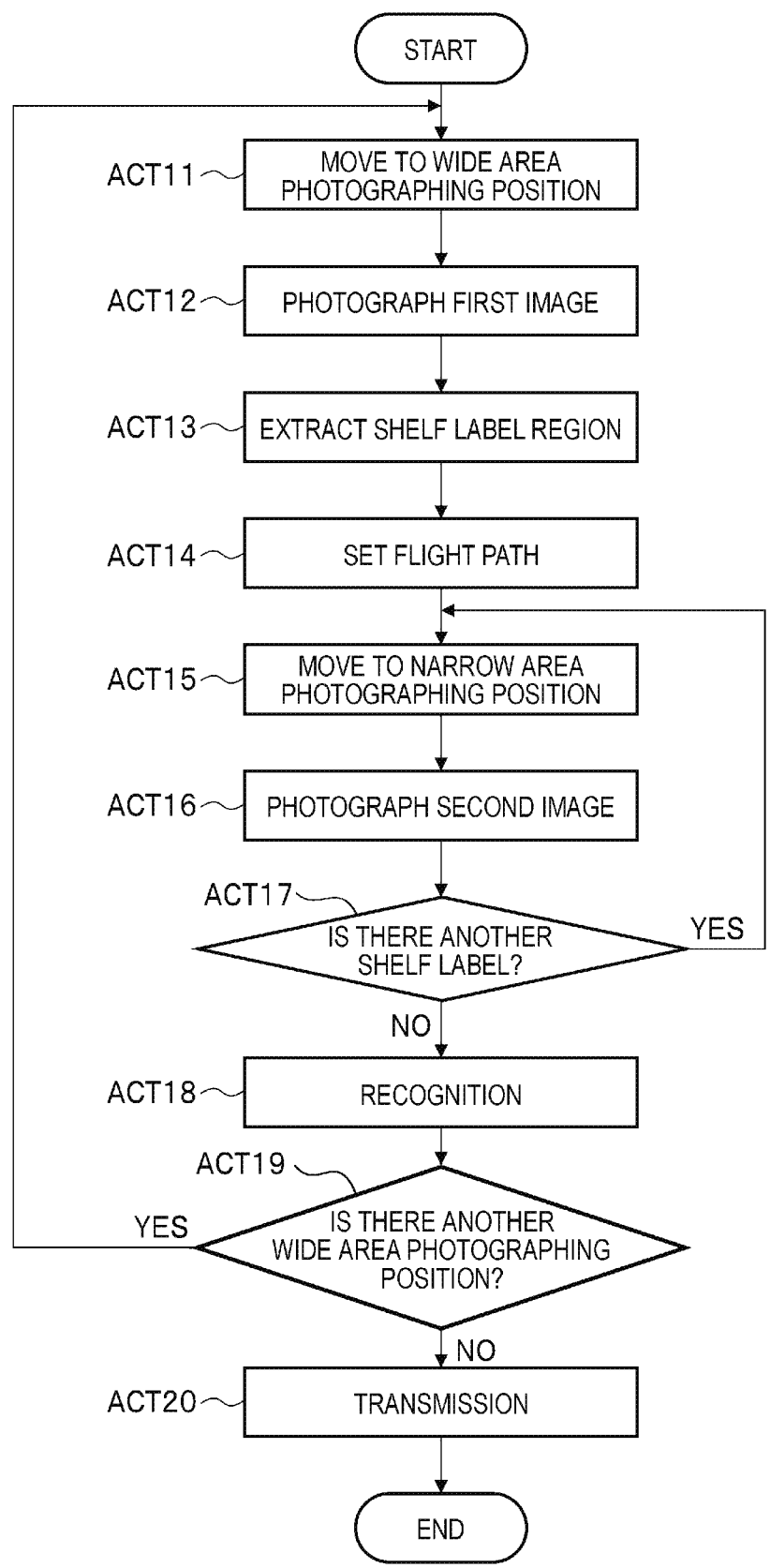
FIG. 9 is a flowchart illustrating an operation example of a photographing device according to an embodiment.

FIG. 9 illustrates a flowchart for describing the operation example of the photographing device 10.

The photographing device 10 is in a state in which the device can be started and operated.

The processor 11 of the photographing device 10 moves the photographing device 10 to the wide area photographing position using the flying mechanism 30 (ACT 11). When the photographing device 10 is moved to the wide area photographing position, the processor 11 photographs a first image (a wide area view) using the photographing camera 20 from the first distance (ACT 12).

Once the first image is photographed, the processor 11 then extracts the shelf label regions from the first image (ACT 13). If a shelf label region is extracted, the processor 11 then sets a flight path based on the extracted shelf label regions (ACT 14).

Once the flight path is set, the processor 11 moves the photographing device 10 to the narrow area photographing position (close-up view position) along the flight path using the flying mechanism 30 (ACT 15). When the photographing device 10 is moved to a narrow area photographing position, the processor 11 photographs a second image of just one shelf label 101 using the photographing camera 20 from the second distance (ACT 16).

Once a second image is photographed, the processor 11 determines whether there is still another unphotographed shelf label 101 (ACT 17). If it is determined that there is another unphotographed shelf label 101 (ACT 17, YES), the processor 11 returns the process to ACT 15.

If it is determined that there is not another unphotographed shelf label 101 (ACT 17, NO), the processor 11 reads (attempts to recognize) the information written on each shelf label 101 from each second image (ACT 18).

Once the information written on each shelf label 101 is read, the processor 11 determines whether there is another wide area photographing position (ACT 19). If it is determined that there is another wide area photographing position (ACT 19, YES), the processor 11 returns the process to ACT 11.

If it is determined that there is not another wide area photographing position (ACT 19, NO), the processor 11 transmits the information read from each shelf label 101 to the management device 50 through the communication unit 13 (ACT 20). After the information read from each shelf label 101 is transmitted to the management device 50, the processor 11 ends the operation.

In some examples, every time the processor 11 photographs a new second image, the processor may read the information written on the shelf label 101 from this new second image. In addition, in some examples, every time the processor 11 reads the information written on a shelf label 101, the processor may transmit this read information to the management device 50 through the communication unit 13 rather than transmit all read information together.

In addition, some examples, the processor 11 may not itself read (recognize) the information written on a shelf label 101 from a second image, but rather may transmit the second image to the management device 50 through the communication unit 13. In this case, the management device 50 would read the information written on the shelf label 101 from the second image.

In addition, the processor 11 may check for a defect in the shelf label 101 based on the information read from the shelf label 101. For example, the processor 11 may reads management information describing the position and the intended content of the shelf label 101 and the like. The processor 11 may determine whether the shelf label 101 is not presently attached, whether an unnecessary shelf label 101 is presently attached, or whether the information written on the shelf label 101 is misplaced or incorrect based on the management information. The processor 11 transmits such a determination result to the management device 50 through the communication unit 13.

If the processor 11 cannot extract the shelf label region 111 from the first image, the processor 11 may not attempt to photograph the second image.

If the processor 11 extracts just one shelf label region 111 from the first image, the processor 11 might not set a flight path. In this case, the processor 11 moves the photographing device 10 directly to the narrow area photographing position corresponding to one shelf label region 111 to photograph a second image.

The processor 11 may cause the photographing camera 20 to acquire the second image while the photographing device 10 is moving along the flight path. That is, the processor 11 may cause the photographing camera 20 to photograph the image without hovering or pausing the photographing device 10 at the narrow area photographing position. In this case, the processor 11 may move the photographing device 10 through the narrow area photographing position at a low or lower speed.

In addition, the second image may be an image in which multiple shelf labels 101 are included.

The photographing device having the above configuration photographs a shelf label over a wide area. The photographing device extracts a shelf label region from the photographed image. The photographing device then sets a flight path for photographing the shelf label (s) in a narrow area from the extracted shelf label region (s). The photographing device then photographs the shelf labels within a narrow area (close-up view) while flying along the flight path. As a result, the photographing device can more effectively photograph each of the shelf labels at a close distance. That is, the photographing device can save flight time and energy consumption for photographing the shelf label at a close distance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A flying drone for shelf label checking, the flying drone comprising:
    a flying mechanism configured to move along a flight path;
    a camera mounted to the flying mechanism;
    a camera interface connected to the camera and configured to transmit and receive data to and from the camera;
    a flight control interface connected to the flying mechanism and configured to transmit and receive data to and from the flying mechanism; and
    a processor configured to:
        acquire a first image of a shelf having a plurality of shelf labels attached to a front surface thereof, the first image being acquired by the camera from a first distance from the front surface of the shelf,
        extract shelf label regions in the first image,
        set the flight path for the flying mechanism based on the extracted shelf label regions,
        control the flying mechanism to fly the camera along the flight path to a second distance that is closer to the front surface of the shelf than the first distance,
        acquire a second image with the camera of at least one shelf label from the second distance, and
        check for a defect in the at least one shelf label based on information read from the at least one shelf label in the second image and management information for the at least one shelf label indicating an intended position and content for the at least one shelf label.

2. The flying drone according to claim 1, wherein the processor is configured to set the flight path to pass by positions for each of the extracted shelf label regions.

3. The flying drone according to claim 1, wherein the processor is configured to set the flight path based on energy consumption of the flying mechanism required to pass by positions for each of the extracted shelf label regions.

4. The flying drone according to claim 1, wherein the processor is configured to cause the flying mechanism to hover in front of each extracted shelf label region.

5. The flying drone according to claim 1, wherein the flying mechanism includes a control camera.

6. The flying drone according to claim 1, wherein the camera is a control camera of the flying mechanism.

7. A method for shelf label checking, the method comprising:
    with a flying drone with a camera mounted thereon, acquiring a first image of a shelf having a plurality of shelf labels on a front surface of the shelf, the first image being acquired from a first distance using the camera;
    extracting shelf label regions from the first image for each of the plurality of shelf labels in the first image;
    setting a flight path for the flying drone based on the extracted shelf label regions;
    causing the flying drone to fly along the set flight path to acquire a second image of each of the plurality of shelf labels in turn from a second distance closer to the shelf than the first distance; and
    checking for a defect in each of the plurality of shelf labels based on information read from each shelf label in the second image of the shelf label and management information for the respective shelf label indicating an intended position and content for the respective shelf label.

8. The method according to claim 7, wherein the flight path is set to pass by positions for each of the extracted shelf label regions.

9. The method according to claim 7, wherein the flight path is set based on energy consumption of the flying drone required to pass by positions for each of the extracted shelf label regions.

10. The method according to claim 7, wherein the flying drone hovers in front of each of the extracted shelf label regions to acquire the second image of the shelf label in the extract shelf label region.

11. The method according to claim 7, wherein the flying drone includes a control camera.

12. The method according to claim 7, wherein the camera is a control camera of the flying drone.

13. A shelf label checking system, comprising:
    a management device;
    a flying drone configured to communicate with the management device, the flying drone including:
        a flying mechanism configured to move along a flight path;
        a camera mounted to the flying mechanism;
        a camera interface connected to the camera and configured to transmit and receive data to and from the camera;
        a flight control interface connected to the flying mechanism and configured to transmit and receive data to and from the flying mechanism; and
        a processor configured to:
            acquire a first image of a shelf having a plurality of shelf labels attached to a front surface thereof, the first image being acquired by the camera from a first distance from the front surface of the shelf,
            extract shelf label regions in the first image,
            set the flight path for the flying mechanism based on the extracted shelf label regions,
            control the flying mechanism to fly the camera along the flight path to a second distance that is closer to the front surface of the shelf than the first distance,
            acquire a second image with the camera of at least one shelf label from the second distance, and
            check for a defect in the at least one shelf label based on information read from the at least one shelf label in the second image and management information from the management device for the at least one shelf label indicating an intended position and content for the at least one shelf label.

14. The shelf label checking system according to claim 13, wherein the processor is configured to set the flight path to pass by positions for each of the extracted shelf label regions.

15. The shelf label checking system according to claim 13, wherein the processor is configured to set the flight path based on energy consumption of the flying mechanism required to pass by positions for each of the extracted shelf label regions.

16. The shelf label checking system according to claim 13, wherein the processor is configured to cause the flying mechanism to hover in front of each extracted shelf label region.

17. The shelf label checking system according to claim 13, wherein the flying mechanism includes a control camera.

18. The shelf label checking system according to claim 13, wherein the camera is a control camera of the flying mechanism.

* * * * *